(12) United States Patent
Pegurier (10) Patent No.: US 11,624,396 B2
(45) Date of Patent: Apr. 11, 2023

(54) FASTENER SEAL CAP DEVICES AND METHODS

(71) Applicant: EMBRAER S.A., São José dos Campos-SP (BR)

(72) Inventor: Sérgio Pegurier, São Josédos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 340 days.

(21) Appl. No.: 16/756,968

(22) PCT Filed: Oct. 20, 2017

(86) PCT No.: PCT/BR2017/000127
§ 371 (c)(1),
(2) Date: Apr. 17, 2020

(87) PCT Pub. No.: WO2019/075532
PCT Pub. Date: Apr. 25, 2019

(65) Prior Publication Data
US 2021/0040979 A1 Feb. 11, 2021

(51) Int. Cl.
*F16B 37/14* (2006.01)
(52) U.S. Cl.
CPC .................... *F16B 37/14* (2013.01)
(58) Field of Classification Search
CPC ...................................................... F16B 37/14
See application file for complete search history.

(56) References Cited

U.S. PATENT DOCUMENTS

| 5,980,178 A | * | 11/1999 | Ono | F16B 35/00 |
| | | | | 411/430 |
| 2008/0044254 A1 | * | 2/2008 | Wilson | F16B 37/14 |
| | | | | 411/429 |

FOREIGN PATENT DOCUMENTS

| GB | 2 163 817 | | 3/1986 | |
| GB | 2163817 A | * | 3/1986 | ............ F16B 33/004 |
| JP | S5518606 U | * | 2/1980 | |

OTHER PUBLICATIONS

International Search Report for PCT/GB2017/000127 dated Jun. 22, 2018, 3 pages.
Written Opinion of the ISA for PCT/GB2017/000127 dated Jun. 22, 2018, 5 pages.

* cited by examiner

*Primary Examiner* — Jacob M Amick
*Assistant Examiner* — Charles J Brauch
(74) *Attorney, Agent, or Firm* — Nixon & Vanderhye P.C.

(57) ABSTRACT

Seal cap devices are provided as an integral (one-piece) structure comprising an open-ended cylindrical body member sized so as to surround a threaded shaft of a fastener, the body member including an upper wall having (i) an arcuate interior edge which defines an aperture to allow threaded engagement with distalmost threads of the threaded shaft of the fastener, and (ii) at least one slot radially extending from the aperture. The upper wall may include opposed slots radially extending from the aperture, e.g., a pair of opposed slots radially extending from the aperture that are separated from one another by an angle of about 90°. A sealant material within the cap may therefore envelope the threaded shaft of the fastener and any collar nut associated therewith to provide a reliable seal.

24 Claims, 10 Drawing Sheets

FASTENER SEAL CAP DEVICES AND METHODS

This application is the U.S. national phase of International Application No. PCT/BR2017/000127 filed Oct. 20, 2017 which designated the U.S., the entire contents of which are hereby incorporated by reference.

FIELD

The embodiments disclosed herein relate generally to sealing devices (colloquially known as "seal caps") that are employed to provide fluid seals for threaded fasteners, especially seal cap devices for fasteners employed in the aerospace industry (e.g., to fluid-seal fasteners associated with wing-internal fuel tank structures and panels).

BACKGROUND

Cup-shaped devices which cover an exposed end of a threaded fastener and contain a sealant material are well known in the aerospace industry so as to seal the fastener against fluid leakage (e.g., fasteners employed for wing-internal fuel tank structures and panels which could be susceptible to fuel leakage over time due to aerodynamic stresses). In this regard, the conventional fastener seal caps will typically be pre-filled with an ambiently curable viscous sealant material and manually pressed by a worker onto and over each exposed end of the fasteners. (See, e.g., GB 2163817, the entire content of which is expressly incorporated hereinto by reference.) This procedure allows the sealant material to seep out of the seal cap and form a fluid seal around the bottom edge thereof.

One problem with conventional seal caps however is that excess sealant is typically used which increases aircraft weight and also can provide unsightly finish to the aircraft component. Another problem is that the seal caps cannot always reliable be coaxially centered on the exposed end of the fastener thereby possibly providing a less than desirable fluid seal.

What has been needed in the art, therefore are seal cap devices and methods which address the problems noted above. It is towards providing such seal cap devices and methods that the embodiments disclosed herein are directed.

SUMMARY

In general, fastener seal cap devices are provided so as to reliably seal a threaded fastener with minimal excess of sealant material and which allow both manual and automated sealing of the fasteners to be practiced. In accordance with an embodiment of the invention, therefore, a seal cap device is provided as an integral (one-piece) structure comprising an open-ended cylindrical body member sized so as to surround a threaded shaft of a fastener, the body member including an upper wall having (i) an arcuate interior edge which defines an aperture to allow threaded engagement with distalmost threads of the threaded shaft of the fastener, and (ii) at least one slot radially extending from the aperture. The upper wall may include opposed slots radially extending from the aperture, e.g., a pair of opposed slots radially extending from the aperture that are separated from one another by an angle of about 90°.

An enlarged cylindrical base may be provided which has an upper edge joined to a lower edge of the cylindrical body member. In such an embodiment, the cylindrical body member will have a smaller diameter as compared to a diameter of the base. A beveled transition annulus integrally joining an upper edge of the base to the lower edge of the body member may be provided with such an embodiment.

A bottom edge of the cylindrical body member (or base) may define a series of circumferentially spaced-apart openings to allow an amount of flowable sealant material which is present in the interior space of the body member to seep or exude therethrough and form a bead of sealant material at the bottom edge. In order to assist with the manual or automated manipulation of the seal cap device, the body member may be provided with a series of axially extending knurls equidistantly spaced apart from one another about a circumferential exterior surface thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
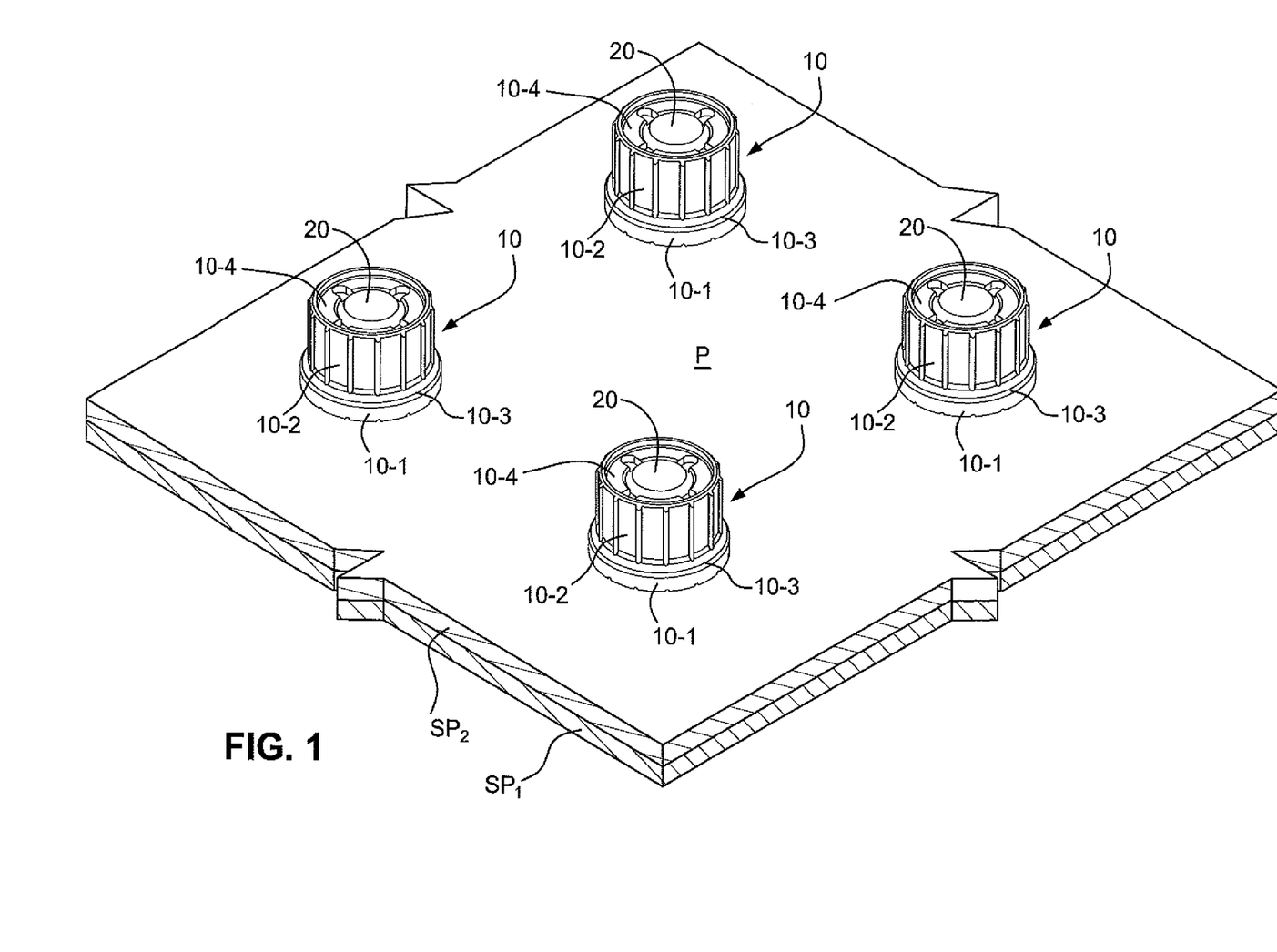
FIG. 1 is a perspective view of an exemplary panel assembly provided with fastener seal cap devices in accordance with an embodiment of the invention.

Accompanying FIG. 1 depicts a number of seal cap devices 10 in accordance with an embodiment of the present invention that are employed in combination with threaded fasteners 20 that join subpanels SP1 and SP2 to form a panel structure P (e.g., a component part of a wing-internal fuel tank of an aircraft). As is perhaps more clearly depicted in FIGS. 2-4, the threaded fastener 20 conventionally joins the subpanels SP1 and SP2 to one another by a threaded collar nut 22 being threadably engaged with the threaded shaft 20a of the fastener so as to apply compressive force between the subpanels SP1, SP2 and the head 20b of the fastener 20. As will be explained in greater detail below, the seal cap 20 is coaxially threadably engaged with at least some of the exposed threads of the fastener shaft 20a so as to cover the shaft 20a and its associated collar nut 22.

The structural aspects of one embodiment of the seal cap device 10 is shown in greater detail by FIGS. 5-9. As depicted, the seal cap device 10 is in the form of an integral (one-piece) structure formed of a suitable plastics material (e.g., nylon) having an enlarged cylindrical base 10-1 and a smaller diameter cylindrical body member 10-2 extending coaxially outwardly therefrom. A beveled transition annulus 10-3 integrally joins the upper edge of the base 10-1 to the lower edge of the body member 10-2. The base 10-1 and body member 10-2 of the seal cap 10 collectively define an open-ended cup-shaped interior space sufficiently sized so as to completely surround and cover the threaded fastener shaft 20a of the fastener 20 and the collar nut 22.

The top of the body member 10-2 includes an upper wall 10-4 which includes a circular aperture 10-4a and pairs of radially opposed slots 10-4b, 10-4c extending outwardly therefrom. In the embodiment shown, the pairs of slots 10-4b, 10-4c are angularly spaced apart by about 90°, i.e., so as to present a cruciform appearance. The circular aperture 10-4a is defined by an arcuate edge 10-4d joining the slots 10-4b, 104c. The diameter of the aperture 10-4a is sized and configured so as to allow the edge 10-4d thereof to threadably engage with the exposed threads at the distal end of the threaded shaft 20a of the fastener 20. In this regard, the body member 10-2 will therefore have a sufficient height to permit the edge 10-4d to threadably engage the distalmost threads of fastener 20. The upper wall 10-4 is recessed relative to the upper edge 10-5 of the body member 10-2 so as to provide a recessed space 25 to accommodate excess sealant material 30 (see, e.g., FIGS. 10 and 11) and thereby completely cover the distal end of the fastener shaft 20a.

The base edge 10-6 of the base 10-1 is provided with a series of circumferentially spaced-apart openings 10-6a that allow the interior space of the seal cap to communicate with the exterior environment. In the embodiment shown, the openings 10-6a are equidistantly spaced apart from one another about the circumference of the base edge 10-6. The size, geometric configuration and number of such openings 10-6a are selected so as to allow the viscous sealant material 30 that is pre-filled into the interior space of the seal cap to seep or exude therethrough when the seal cap 10 is installed so as to form respective beads 30a of sealant material 30 at the bottom edge of the base 10-1 and thereby establish a reliable seal between the seal cap 10 and the panel assembly P at the base edge 10-6 (see FIGS. 10-11).

Any conventional aircraft-grade of sealant material 30 that is conventionally used in the aerospace industry for sealing fuel tanks can be employed with the seal cap device 10.

In order to assist in the manual or robotically-assisted manipulation of the seal cap 10 (e.g., to allow turning movements to be applied to the seal cap 10 so as to threadably engage the edge 10-4d with the exposed distal threads of the fastener shaft 20a), the body member 10-2 may be provided with axially extending knurls 10-7 equidistantly spaced apart from one another about the circumferential exterior surface thereof.

Figure 2:
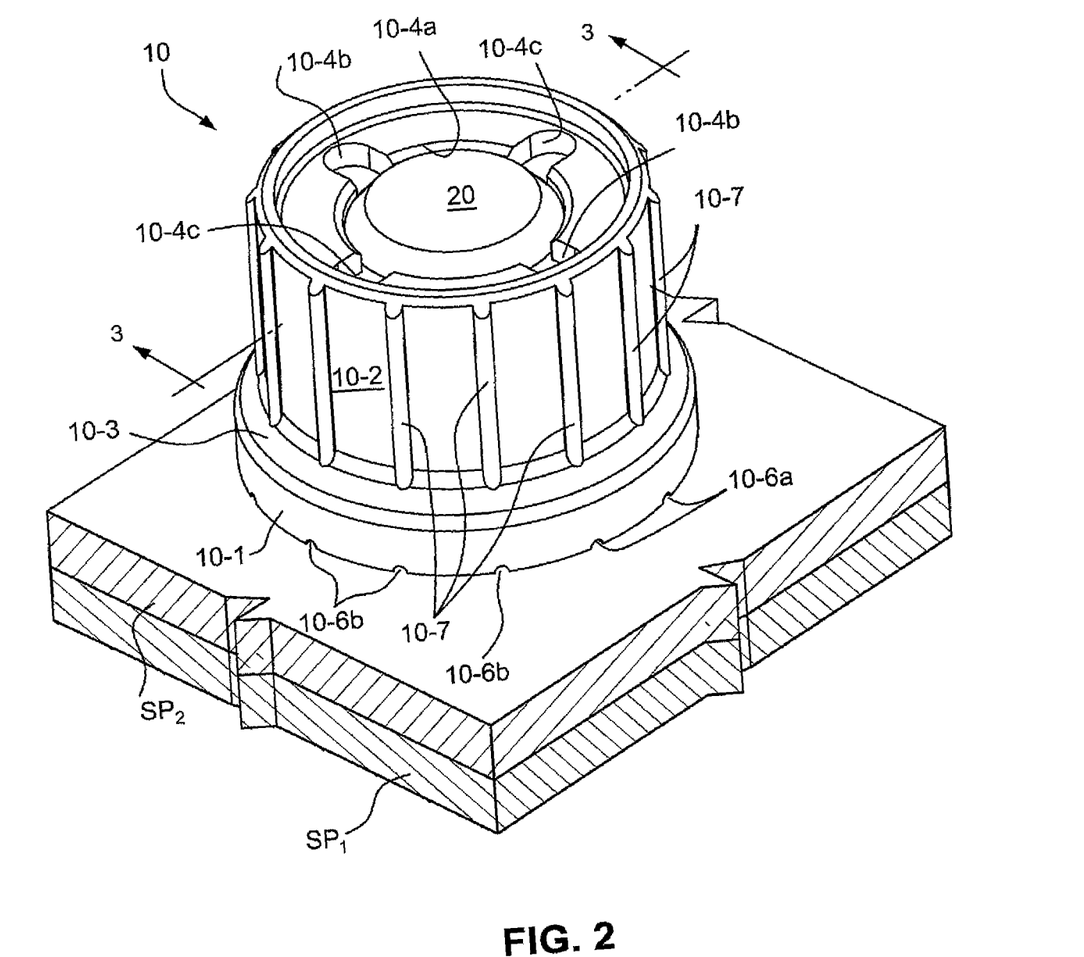
FIG. 2 is an enlarged perspective view of a seal cap device shown in FIG. 1 in the absence of the sealant material.
Figure 3:
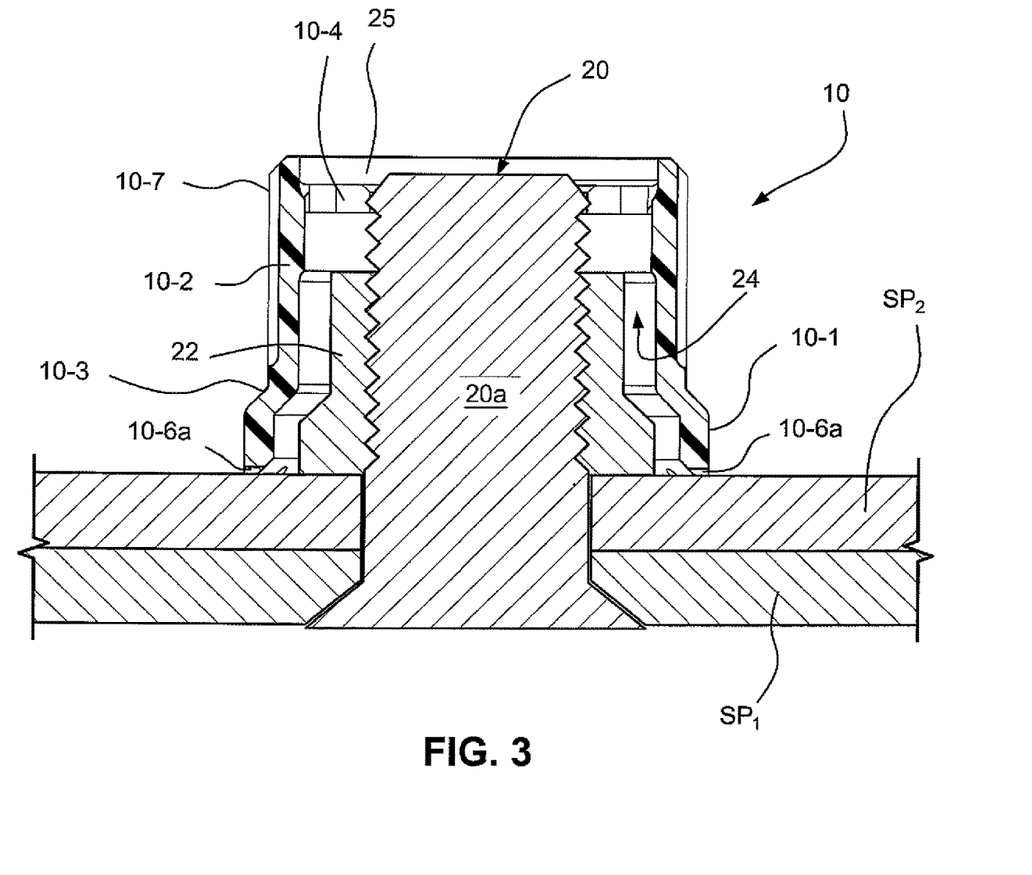
FIG. 3 is a cross-sectional elevational view of the seal cap device depicted in FIG. 2 as taken along lines 3-3 therein.
Figure 4:
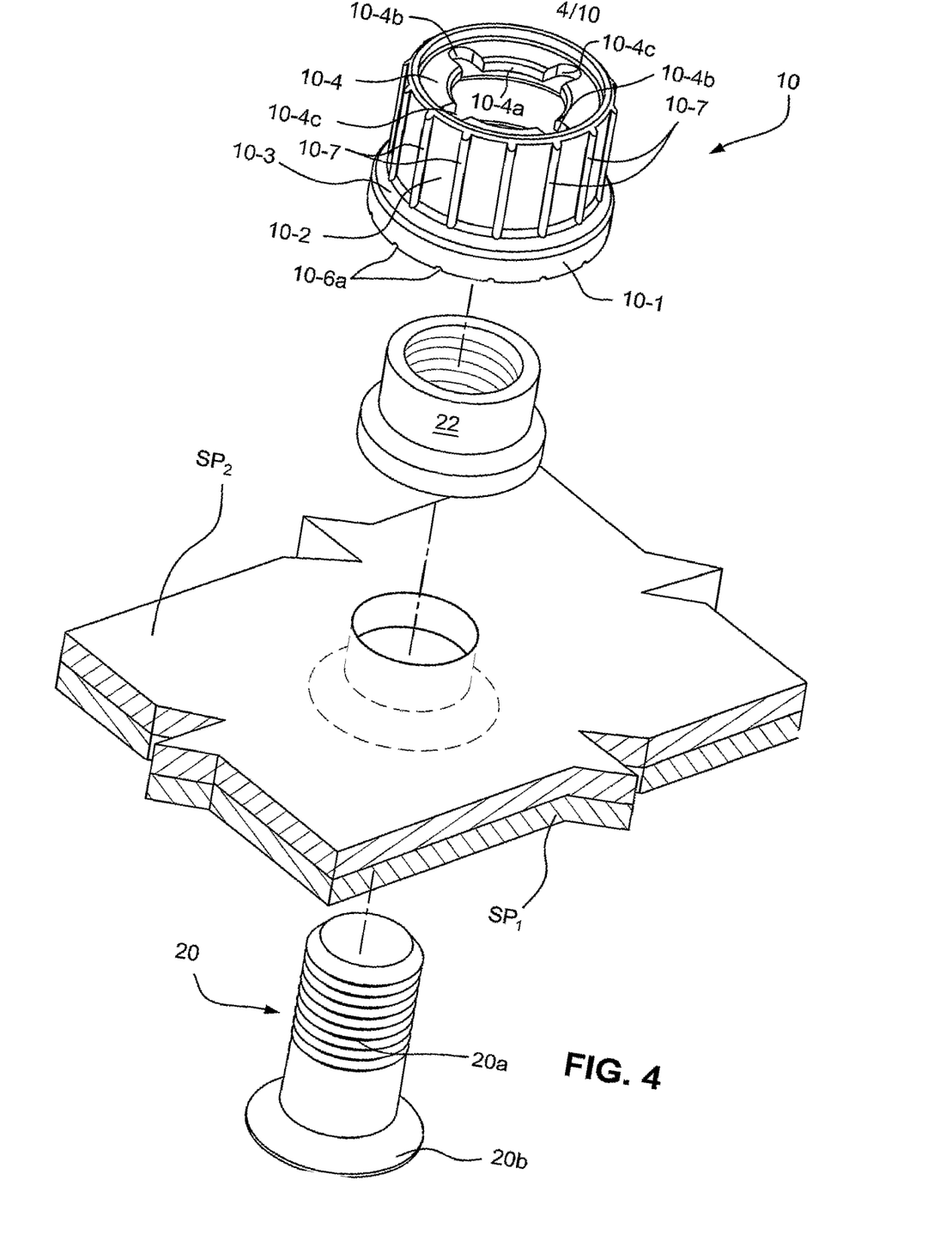
FIG. 4 is an exploded perspective view showing the seal cap assembly comprised of the threaded fastener, the collar member and the seal cap device.
Figure 5:
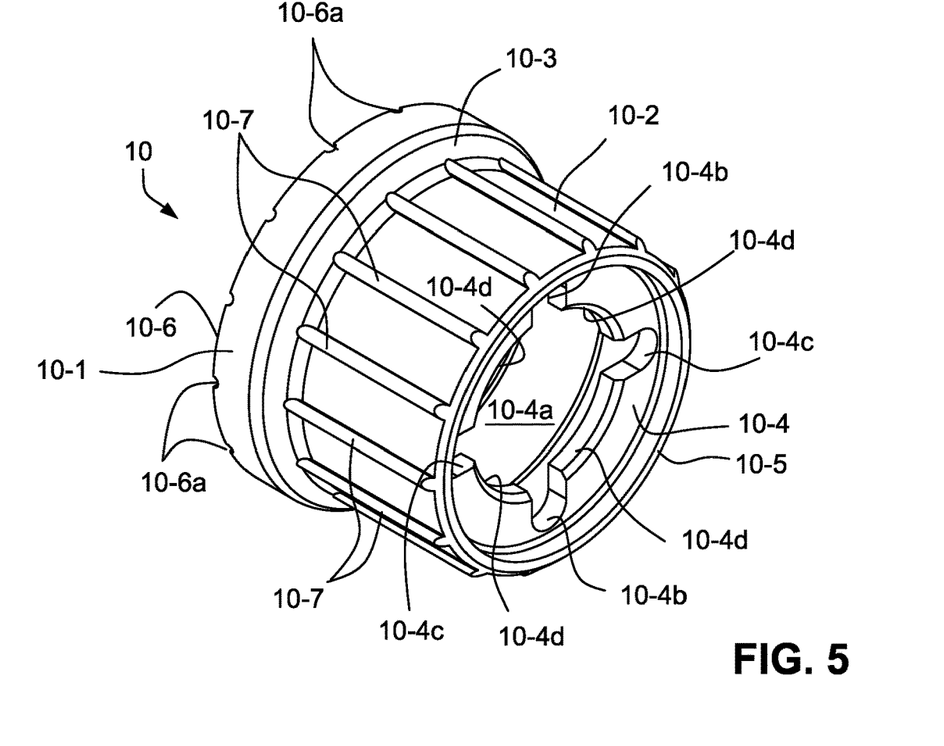
FIGS. 5 and 6 are top and bottom end perspective views, respectively, of a fastener seal cap device in accordance with an embodiment of the invention used in the assembly of FIG. 1.
Figure 6:
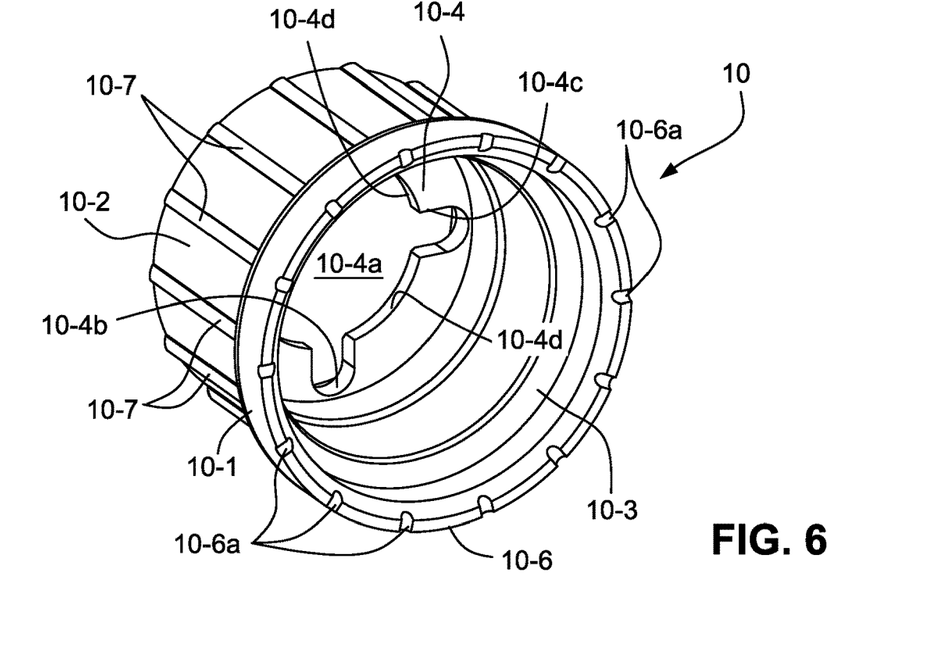
Figure 7:
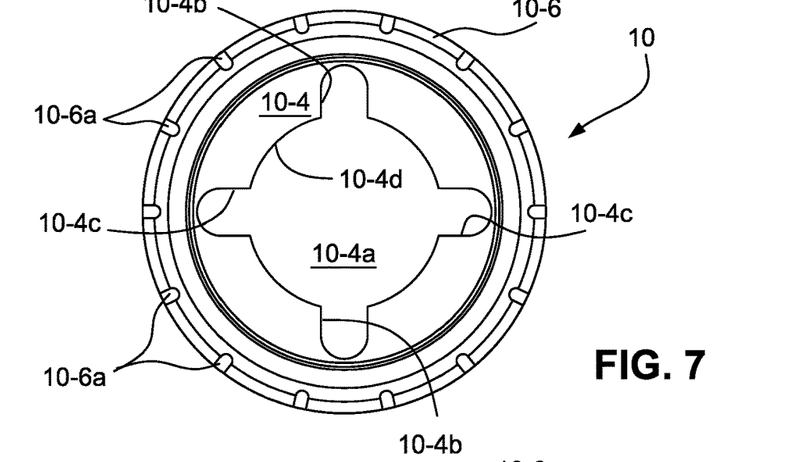
FIG. 7 is a bottom plan view thereof.
Figure 8:
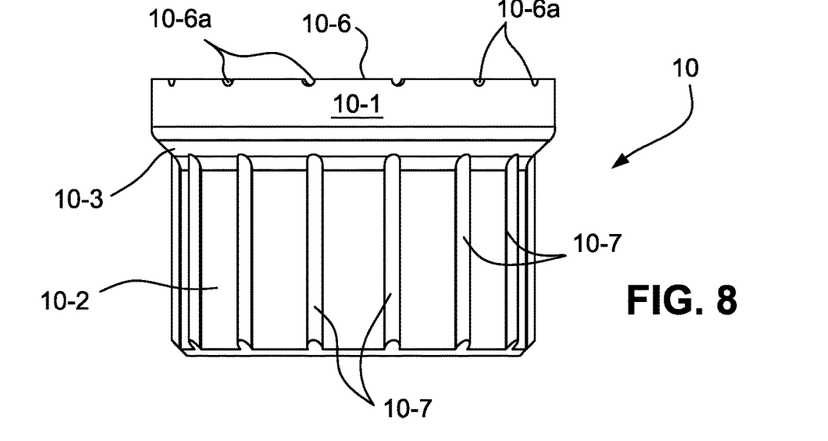
FIG. 8 is a side elevational view thereof.
Figure 9:
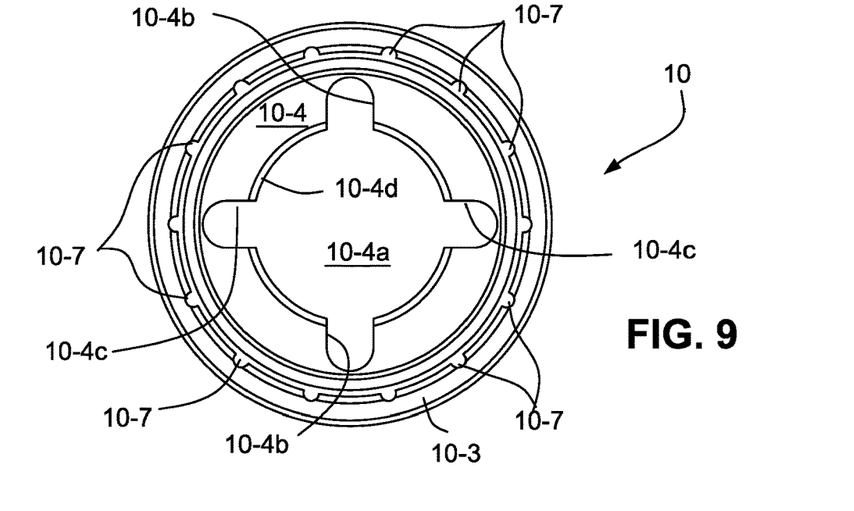
FIG. 9 is a top plan view thereof.

In use, the seal cap 10 having a suitable quantity of sealant material filled within the interior space thereof may initially be threadably engaged with distal exposed threads of the fastener 20 until the base edge 10-6 is physically abutted against the surface of the panel assembly P. Such threaded interconnection can be done either manually or automatically by use of a pre-programmed robotic effector. Since the seal cap 10 is threadably connected to the threaded shaft 20a of the fastener 20, the cylindrical base 10-1 and body member 10-2 will be coaxially positioned in surrounding relationship to both the fastener shaft 20a and the collar nut 22 thereby defining an interior space 24 therebetween. Such a state is depicted in FIGS. 2 and 3.

As the seal cap is being threadably connected to the shaft 20a of the fastener 20, the flowable sealant material (represented by reference numeral 30 in FIGS. 10 and 11) is caused to flow into the recessed space 25 (see FIG. 3) through the cruciform slots 10-4b, 10-4c formed in the upper recessed wall 10-4 of the body member 10-2.

Figure 10:
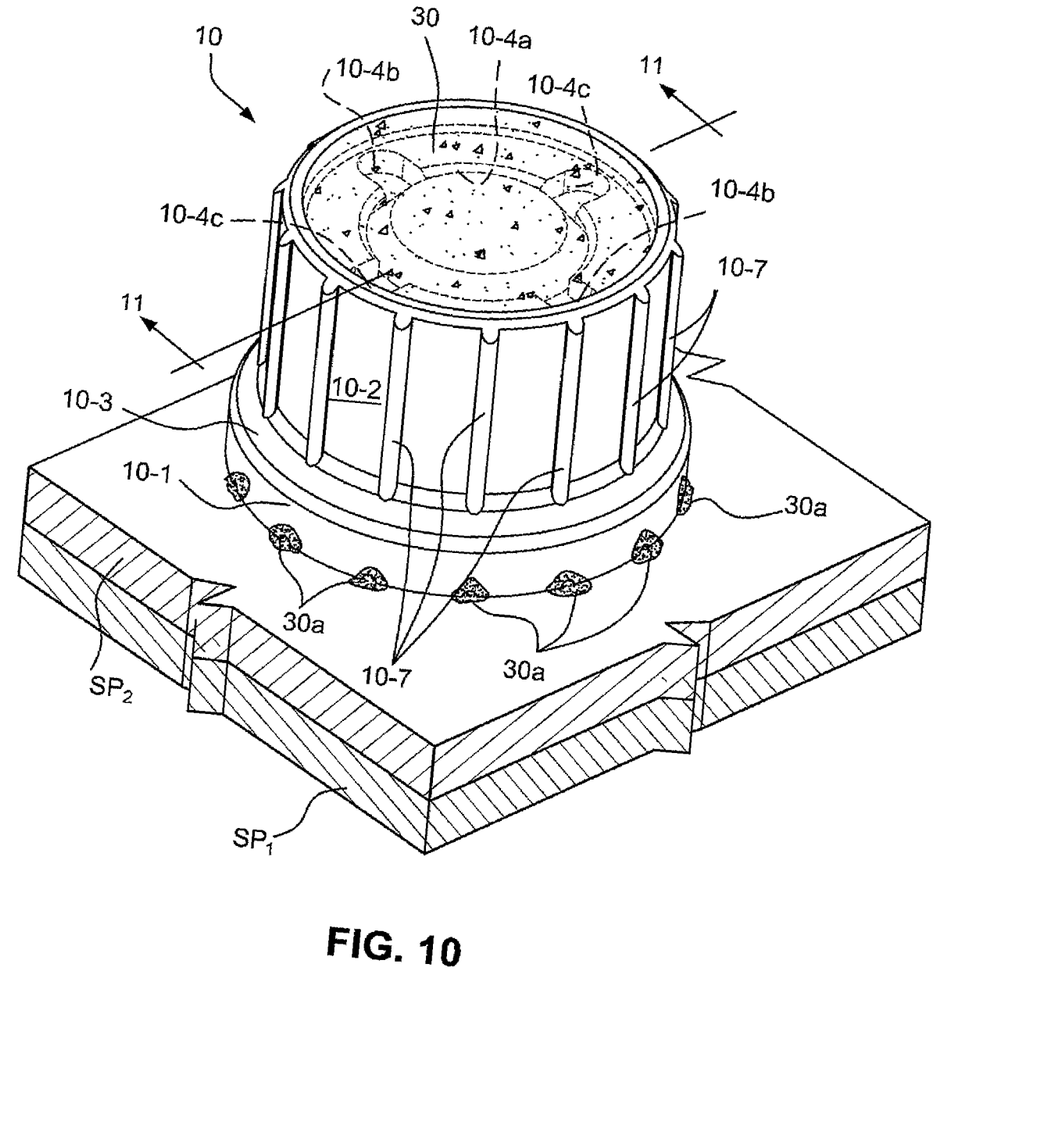
FIG. 10 is an enlarged perspective view of a seal cap device similar to the depiction in FIG. 2 but shown with the sealant material therein.
Figure 11:
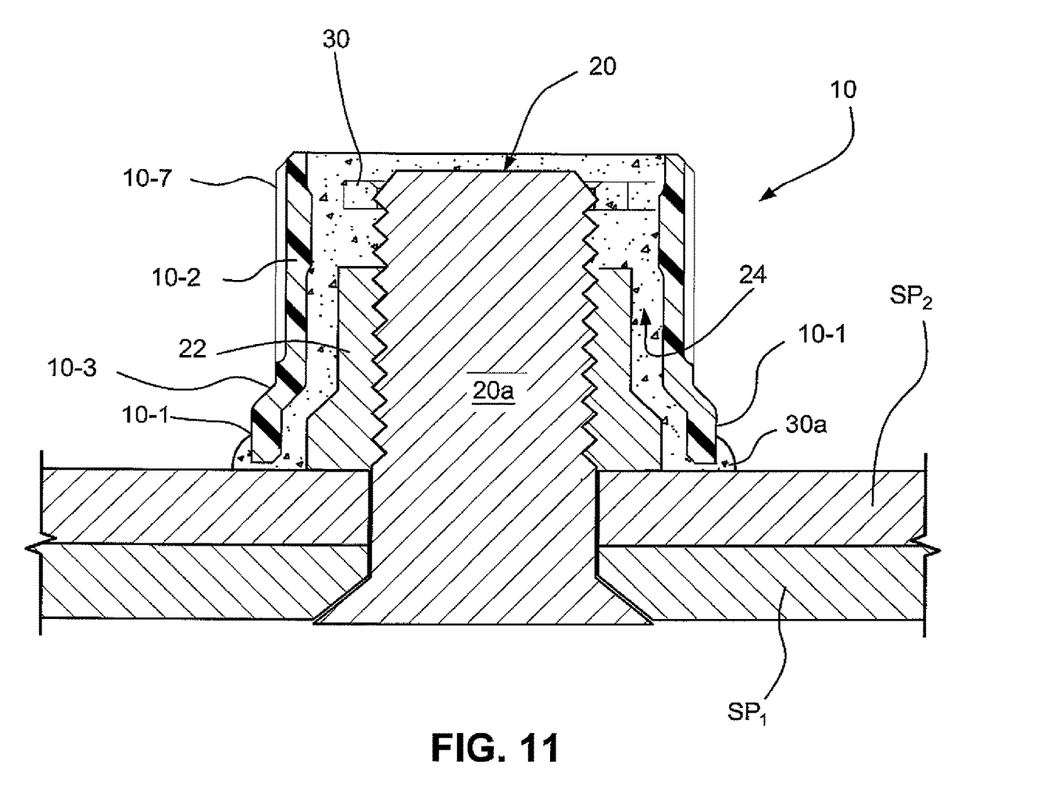
FIG. 11 is a cross-sectional elevational view of the seal cap device depicted in FIG. 4 as taken along lines 11-11 therein.
Figure 12:
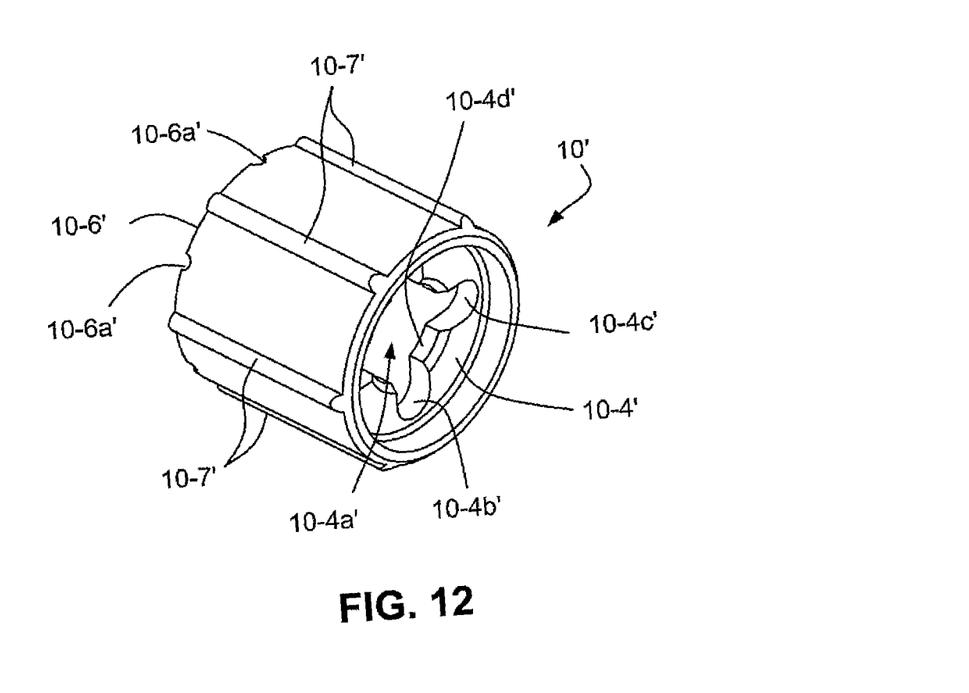
FIGS. 12 and 13 are top and bottom end perspective views, respectively, of a fastener seal cap device in accordance with another embodiment of the invention.
Figure 13:
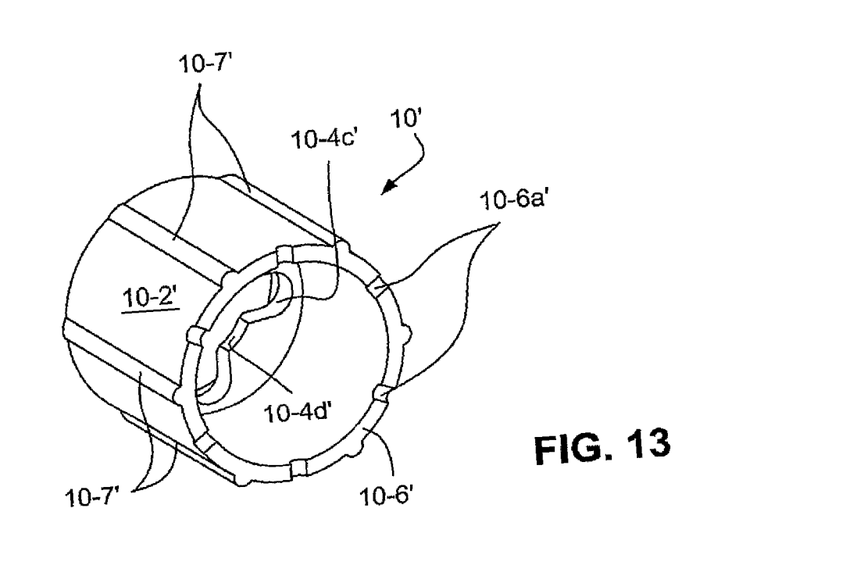
Figure 14:
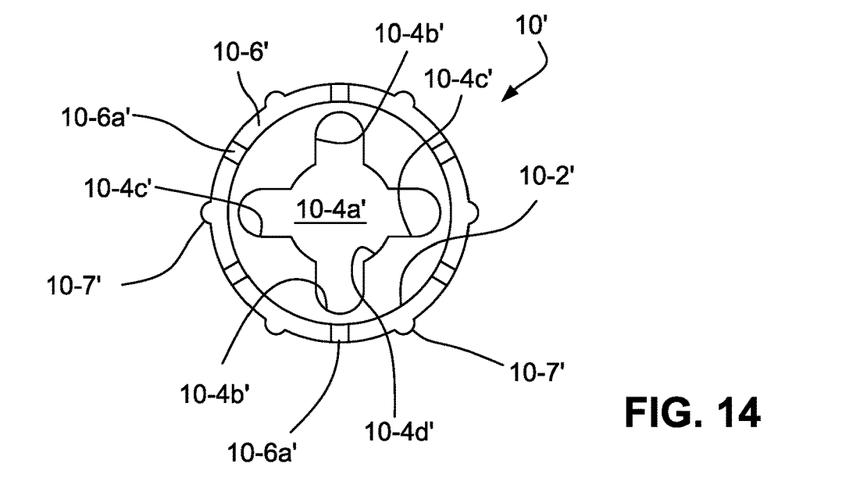
FIG. 14 is a bottom plan view thereof.
Figure 15:
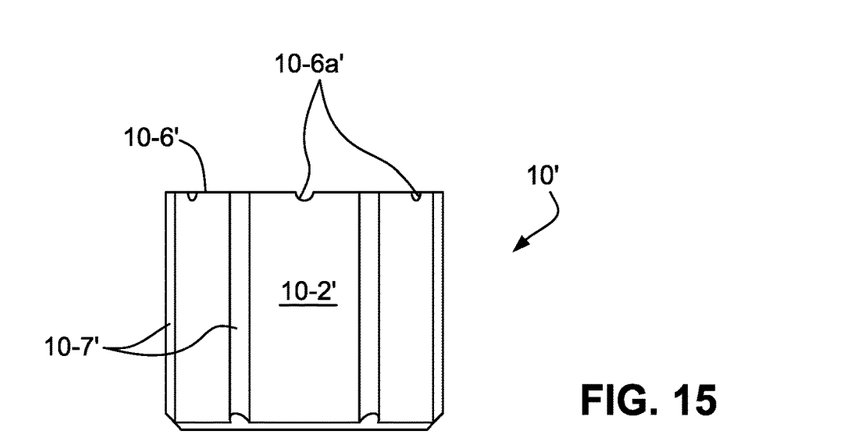
FIG. 15 is a side elevational view thereof.
Figure 16:
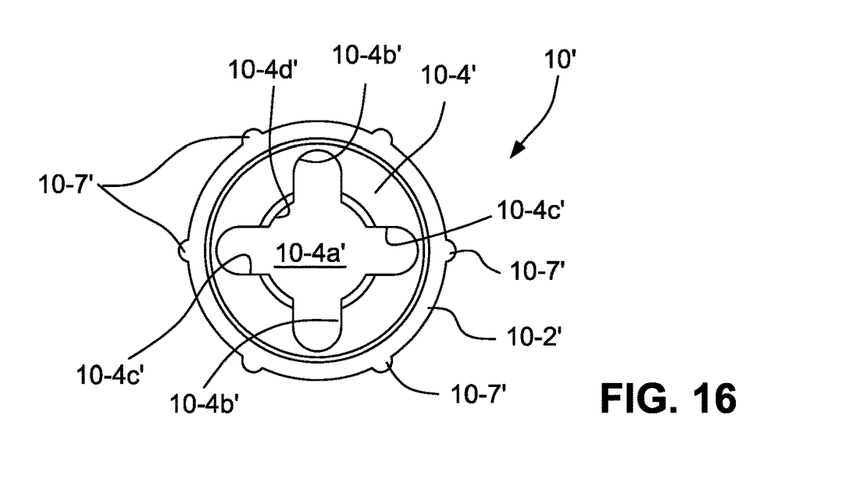
FIG. 16 is a top plan view thereof.

The quantity of sealant material 30 that is pre-filled in the interior space 24 of the seal cap device 10 is selected so that a small amount is allowed to seep or exude through the openings 10-6a formed in the base edge 10-6 of the base member 10-1 and thereby form the beads 30a. As noted above, another amount of the sealant material 30 may seep or exude through the slots 10-4b, 10-4c so as to be present in the recessed space 25 on the upper wall 10-4 of the body member 20-1. The sealant material 30 will therefore fill the interior space 24 defined by the base 10-1 and body member 10-4 so to envelop entirely the collar nut 22 and exposed threads of the threaded shaft 20a as well as form a reliable seal at the bottom edge 10-6 of the base 10-1. Such a state is shown in FIGS. 10 and 11. In such a manner, therefore, the fastener 20 and collar nut 22 are reliably sealed against fluid leakage that may occur later, e.g., by virtue of aerodynamic forces during use.

Accompanying FIGS. 12-16 another embodiment of a seal cap device 10' in accordance with the invention. The seal cap device 10' is structurally similar to the seal cap device 10 discussed previously with the principal exception being that the latter is of a somewhat smaller size so as to accommodate a smaller-sized fastener and collar nut. Thus, similar structural elements that have already been discussed with respect to the embodiment of the seal cap device 10 which are also present in the embodiment of the seal cap device 10' will be depicted in FIGS. 12-16 with the same reference numeral having a prime designation ('). One difference that will be observed is that the embodiment of the seal cap device 10' depicted in FIGS. 12-16 does not include the base 10-1 as is the case with the seal cap device 10. However, the openings 10-6a' of the seal cap 10' are nonetheless present in the bottom edge 10-6' of the cylindrical body member 10-2' to serve the same purpose as has already been described.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A fastener seal cap device comprising:
an open-ended cylindrical body member sized so as to surround a threaded shaft of a fastener, wherein the cylindrical body member is comprised of:
(a) an upper wall having (i) an arcuate interior edge which defines an aperture to allow threaded engagement with distalmost threads of the threaded shaft of the fastener, and (ii) at least one slot radially extending from the aperture, and (b) a bottom edge which defines a series of circumferentially spaced-apart openings, wherein the bottom edge is adapted to being placed in contact against a surface of a structural member such that a quantity of sealant material introduced within an interior space of the body member is capable of being exuded through each of the openings so as to form a respective bead at the bottom edge of the cylindrical body member.

2. The device as in claim 1, wherein the upper wall includes opposed slots radially extending from the aperture.

3. The device as in claim 2, wherein the upper wall includes a separated pair of the opposed slots radially extending from the aperture.

4. The device as in claim 3, wherein the pair of opposed slots are separated from one another by about 90°.

5. The device as in claim 1, which further comprises:
an enlarged cylindrical base having an upper edge joined to a lower edge of the cylindrical body member, wherein
the cylindrical body member has a smaller diameter as compared to a diameter of the enlarged cylindrical base, and wherein
the enlarged cylindrical base includes the bottom edge which defines the series of circumferentially spaced-apart openings.

6. The device as in claim 5, further comprising a beveled transition annulus integrally joining the upper edge of the base to the lower edge of the cylindrical body member.

7. The device as in claim 1, wherein the cylindrical body member further includes a series of axially extending knurls equidistantly spaced apart from one another about a circumferential exterior surface thereof.

8. The device as in claim 1, wherein the upper wall is recessed relative to an upper edge of the cylindrical body member so as to define an upper recessed space above the upper wall.

9. An assembly comprising:
a structural panel;
a fastener having a head and a threaded shaft extending through the structural panel;
a collar nut threadably connected to the threaded shaft of the fastener and exerting a compressive force against a surface of the structural panel;
a seal cap device having an open-ended cylindrical body member sized so as to surround the threaded shaft of a fastener, the seal cap device being thereby a threadably connected to distalmost threads of the threaded shaft such that the body member coaxially surrounds the threaded shaft of the fastener; and
a sealant material filling an interior space of the body member so as to envelop the collar nut and exposed threads of the threaded shaft, wherein
the seal cap device is comprised of:
(a) an upper wall having (i) an arcuate interior edge which defines an aperture to allow threaded engagement with distalmost threads of the threaded shaft of the fastener, and (ii) at least one slot radially extending from the aperture, and
(b) a bottom edge which defines a series of circumferentially spaced-apart openings, wherein the bottom edge is in contact with the surface of the structural member such that a quantity of the sealant introduced filling the interior space of the cylindrical body member exudes through each of the defined openings and forms a respective bead at the bottom edge of the cylindrical body member.

10. The assembly as in claim 9, wherein the upper wall includes opposed slots radially extending from the aperture.

11. The assembly as in claim 9, wherein the upper wall includes a separated pair of the opposed slots radially extending from the aperture.

12. The assembly as in claim 10, wherein the pair of opposed slots are separated from one another by about 90°.

13. The assembly as in claim 9, which further comprises an enlarged cylindrical base having an upper edge joined to a lower edge of the cylindrical body member, wherein the cylindrical body member has a smaller diameter as compared to a diameter of the base.

14. The assembly as in claim 13, wherein the base includes the bottom edge of the cylindrical body member which defines the series of circumferentially spaced-apart openings.

15. The assembly as in claim 13, further comprising a beveled transition annulus integrally joining an upper edge of the base to the lower edge of the body member.

16. The assembly as in claim 9, wherein the body member further includes a series of axially extending knurls equidistantly spaced apart from one another about a circumferential exterior surface thereof.

17. The assembly as in claim 9, wherein the upper wall is recessed relative to an upper edge of the body member so as to define an upper recessed space above the upper wall, wherein a quantity of sealant material fills the recessed space.

18. An aircraft which comprises the assembly as in claim 9.

19. The aircraft as in claim 18, wherein the structural panel is associated with a wing-internal fuel tank structure.

20. A method of sealing a fastener of a panel comprising the steps of:
(i) threadably connecting a fastener seal cap device to distalmost threads of a threaded shaft of the fastener such that a bottom edge of the body member of the seal cap device is engaged with a surface of the panel; and
(ii) introducing a flowable sealant material into an interior space of the body member through the at least one slot of the upper wall thereof so as to fill the interior space and envelop the threaded shaft of the fastener, wherein the fastener seal cap device comprises:
an open-ended cylindrical body member sized so as to surround a threaded shaft of a fastener, and wherein the body member includes an upper wall having (i) an arcuate interior edge which defines an aperture to allow threaded engagement with distalmost threads of the threaded shaft of the fastener, and (ii) at least one slot radially extending from the aperture.

21. The method as in claim 20, wherein step (ii) is practiced by allowing a quantity of the sealant material to exude through openings formed in the bottom edge of the body member to thereby form beads of the sealant material at the bottom edge of the body member.

22. The method as in claim 20, wherein the upper wall is recessed relative to an upper edge of the body member so as to define an upper recessed space above the upper wall, and wherein step (ii) is practiced to allow a quantity of the sealant material to fill the recessed space.

23. A fastener seal cap device comprising:
an open-ended cylindrical body member sized so as to surround a threaded shaft of a fastener, and
an enlarged cylindrical base having an upper edge joined to a lower edge of the cylindrical body member, wherein the cylindrical body member has a smaller diameter as compared to a diameter of the base; wherein the body member includes an upper wall having (i) an arcuate interior edge which defines an aperture to allow threaded engagement with distalmost threads of the threaded shaft of the fastener, and (ii) at least one slot radially extending from the aperture; and wherein the base includes a bottom edge which defines a series of circumferentially spaced-apart openings.

24. An assembly comprising:

a structural panel;

a fastener having a head and a threaded shaft extending through the structural panel;

a collar nut threadably connected to the threaded shaft of the fastener and exerting a compressive force against a surface of the panel;

a seal cap device threadably connected to distalmost threads of the threaded shaft such that the body member coaxially surrounds the threaded shaft of the fastener; and a sealant material filling an interior space of the body member so as to envelop the collar nut and exposed threads of the threaded shaft, wherein the seal cap device comprises:

(a) an open-ended cylindrical body member sized so as to surround a threaded shaft of a fastener, and (b) an enlarged cylindrical base having an upper edge joined to a lower edge of the cylindrical body member, wherein the cylindrical body member has a smaller diameter as compared to a diameter of the base, wherein the body member includes an upper wall having (i) an arcuate interior edge which defines an aperture to allow threaded engagement with distalmost threads of the threaded shaft of the fastener, and (ii) at least one slot radially extending from the aperture, and wherein the base includes a bottom edge which defines a series of circumferentially spaced-apart openings, wherein a quantity of the sealant material is capable of flowing through the openings and forming respective beads at the base edge of the cylindrical body member.

* * * * *